June 10, 1930.   L. P. STRONG   1,763,486
VALVE
Filed Sept. 24, 1925

Inventor
Leslie P. Strong
By Brockett & Hyde
Attorney

Patented June 10, 1930

1,763,486

UNITED STATES PATENT OFFICE

LESLIE P. STRONG, OF LAKEWOOD, OHIO, ASSIGNOR TO THE CLARK MANUFACTURING COMPANY, OF CLEVELAND, OHIO, A CORPORATION OF OHIO

VALVE

Application filed September 24, 1925. Serial No. 58,383.

This invention relates to valves and particularly to the globe type utilized for high pressures, being particularly adapted for use in connection with high pressure steam.

It has been customary for many years to employ in a valve, suitable valve seats which will permit continued use of the valve without excessive leakage. In some instances the stationary seat is machined from the valve body itself and the movable seat or member is equipped with packing of some sort which will seat itself readily upon the stationary seat and avoid leakage in spite of frequent use. With all of these valves it is difficult to prevent leakage when they are used in connection with high pressures on account of the familiar disastrous results accompanying the wire drawing of the fluid under high pressures past the seats. It is also a fact that none of these valves have been equipped with seats free from damage resulting from foreign hard material becoming imbedded in one or the other of the seats.

The present invention therefore aims to overcome the above difficulties by providing the valve body with a separate removable stationary seat of material resistant to wear as far as possible and resistant to indentations or mars created by foreign matter being forced against it. For use in connection with this seat the removable valve member is also provided with a hardened head member of the same material as the fixed or stationary seat and is therefore resistant to wear and resistant to indentations by foreign matter. With a valve of this type any foreign matter lodging between the head member and its seat member will merely hold the valve open until the foreign matter is removed which may be accomplished by opening the valve. When the foreign matter has disappeared the valve may be closed when it will hold against leakage. It is also a part of this invention to construct the valve body and the fixed seat in a manner such that the latter is readily removable but at the same time is sealed against leakage resulting from expansion and contraction of the supporting parts of the valve body. Another feature is the removability of the valve head member which is preferably loosely mounted in the movable valve member so that its seating portion may adjust itself to the fixed valve seat, thereby insuring perfect seating of the parts of the valve with small chance of leakage.

Other features of the invention will be brought out in the following description, drawings and claims.

Figure 1:
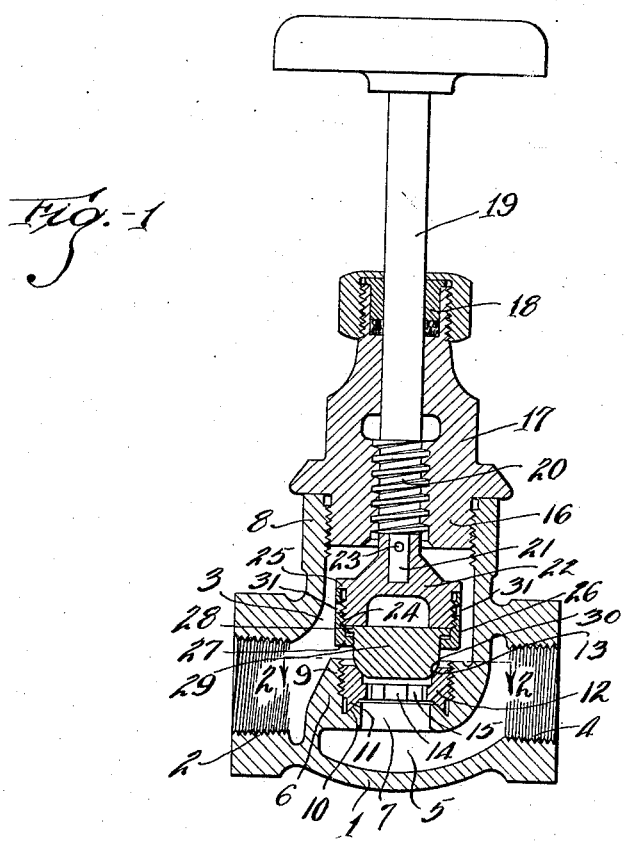
Figure 2:
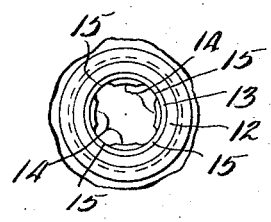

Referring to the drawings, Fig. 1 is a vertical sectional view through the valve and Fig. 2 is a section through the central portion of the valve body showing the stationary valve seat in place.

In the arrangement shown in the drawings, 1 represents the usual valve body of the globe type having the threaded inlet nipple portion 2 leading to the movable valve member chamber 3 and the threaded outlet nipple portion 4, leading to the chamber 5 below the fixed or stationary valve seat. These chambers 3 and 5 are separated by the usual partition wall 6 provided with the usual opening 7 concentric with the opening in the bonnet receiving portion 8. The partition 6 at the opening 7 is provided with an internally threaded cylindrical part 9 and a smaller upwardly extending seat 10 tapered downwardly and outwardly. Engaging this seat is an internally tapered part 11 of the annular valve seat member 12 threaded into the part 9 and provided with the usual tapered valve seat surface 13. Extending inward from the wall of the seat member 12 are suitable lugs 14 forming recesses 15 adapted to receive a suitable square shank wrench for applying and removing the fixed or stationary seat.

Threaded into the bonnet receiving portion 8 is the threaded shank 16 of the bonnet 17 which is of annular construction and is provided with a suitable packing gland structure generally indicated at 18 and located at the upper end. Extending through this stuffing box and through the bonnet is a valve stem 19 provided with the usual screw threads 20 engaging suitable threads in the bonnet and adapted to project into the chamber 3 where it is provided with a reduced portion 21 entering the removable valve 22. Said valve is held on said stem by a suitable pin 23 and has a threaded portion 24 forming a shoulder at 25. Engaging the threaded portion 24 is a retaining ring or sleeve 26 provided with an annular flange 27 adapted for engagement with an annular flange 28 forming an integral part of the hardened movable valve button 29 which is provided with a rounded or partly ball shaped head 30 for engagement with the tapered seat 13 of the fixed valve seat. The retaining ring or sleeve 26 is provided with diametrically disposed openings 31 for the reception of a spanner wrench for use in applying and removing the ring. The hardened movable valve head member or button is held in place by the ring 26 with slight movement when the ring or sleeve is firmly seated. This slight movement insures the proper seating of the valve or, in other words, permits the movable valve member to adjust itself to the fixed or stationary valve member. This lost motion also tends to remove foreign matter from the valve seat and thereby ensures more effective seating of the valve members.

By having the tapered annulus 10 engaged within the lower tapered portion of the fixed seat, a construction is provided which avoids leakage otherwise resulting from expansion and contraction. In other words, as the valve body expands with heat it causes the annulus 10 to be more firmly engaged by the tapered portion of the fixed seat, because of the difference in expansion and contraction of the metal of the annulus and the metal of the body. Upon cooling, however, contraction of the valve body causes the annulus to be still tightly clamped or sealed in the valve body.

Having described my invention I claim:

In a valve adapted to handle steam at high pressures and temperatures, a valve body having a valve opening portion of material having a high coefficient of expansion, and a relatively hard valve seat member having a lesser coefficient of expansion screw-threaded in the opening of said valve body portion, said valve body portion and said seat member having cooperating integral conical portions, that of the valve body extending within that of the valve seat member, said seat member being screwed into the valve body to seat said conical portions one against the other, whereby when the parts are subjected to the temperature of service, the conical portion of the valve body will expand within the corresponding portion of the seat member and force the seat member longitudinally of the opening and its threads against the valve body threads, to grip and seat the seat member between its threaded and its conical portions, and a more efficient seal will be had between the seat member and body both at the threads and at the conical portions.

In testimony whereof I hereby affix my signature.

LESLIE P. STRONG.